3,573,079
METHOD OF MAKING HIGH-PURITY DEAD-BURNED MAGNESIA REFRACTORY GRAINS

Hiroji Shibasaki, Tokyo, and Kyoichi Sasaki, Akira Kubota, Yasuyoshi Oda, and Kenzi Takeo, Iwaki-shi, Japan, assignors to Shin Nihon Kagaku Kogyo Kabushiki Kaisha, Osaka, Japan
No Drawing. Filed Mar. 12, 1968, Ser. No. 712,394
Int. Cl. C04b 35/04
U.S. Cl. 106—58         1 Claim

ABSTRACT OF THE DISCLOSURE

A method of making a high-purity and high-density dead-burned magnesia having a high hot compressive strength by reducing the content of free water in a filter cake of a high-purity magnesium hydroxide which is very difficultly sintered according to the conventional methods known heretofore, to a certain predetermined range, kneading and calcining the filter cake thus treated, compacting preliminarily said calcined magnesia, crushing and sizing the pre-compacted product, shaping into pellets and dead-burning the same to give the desired dead-burned magnesia.

BACKGROUND OF THE INVENTION (1) Field of the invention

This invention relates to a method of making a dead-burned magnesia having high purity and density as well as high hot compressive strength.

(2) Description of the prior art

With the development in the steelmaking technique in recent years which has been quite remarkable, the improvement in the qualities of dead-burned magnesia used for various steelmaking furnaces has kept step therewith, and with regard to the MgO content in such dead-burned magnesia, for example, there has been developed the ones having purities of nearly 99% in these days.

However, it is known well that the sintering of magnesia becomes very difficult as the purity becomes higher and it is particularly true with regard to a high-purity magnesium hydroxide obtained from a saline water and a saturated lime solution.

In order to overcome the difficulty, normally, there have been adopted chemical means in which small amounts of impurities contained in the magnesium hydroxide are adjusted, or, a so-called "crystallization promoter" is incorporated, or, alternatively, a physical means in which the magnesium hydroxide is once calcined to give an active magnesia free from chemically bound water, which is then shaped and dead-burned.

The sintering of magnesia may be promoted by the chemical means mentioned above, for example, by adjusting the composition of impurities contained in small amounts in magnesium hydroxide, e.g., by making a molar ratio of CaO to $SiO_2$ less than 1 to form silicates such as monticellite, $CaO \cdot MgO \cdot SiO_2$, etc., which are compounds of relatively low melting points, or, by incorporating a small amount of a crystallization promoter such as compounds of chromium, manganese, vanadium, boron, or rare earth metals, to form a liquid phase at relatively low temperatures.

However, although such adjustment of chemical composition of impurities and the incorporation of the crystallization promoter as described above are fairly effective for developing magnesia crystals at relatively low temperatures, the resulting dead-burned magnesia refractory grain has a poor volume stability and an insufficient hot compressive strength for use in steelmaking furnaces which are operated at extremely high temperatures in these days by the adoption of oxygen-blowing technique. Thus, in order to obtain a dead-burned magnesia having a good volume stability and a high hot compressive strength at high temperatures, a careful consideration must be given so as not to form compounds of relatively low melting points by maintaining the molar ratio of CaO to $SiO_2$ not less than 2, without adding the crystallization promoter.

That is, in the past, such dead-burned magnesia has been normally obtained by calcining a high-purity magnesium hydroxide followed by shaping and dead-burning.

The present invention relates to an improvement in such a method wherein no crystallization promoter is employed.

Since the individual particle of calcined magnesia is very fine in size and has no adhesiveness at all, it is very difficultly shaped into pellets as the general property of fine powders. Thus, there have been exerted heretofore considerable efforts with regard to the shaping of calcined magnesia powders.

For example, there have been proposed (1) a method in which 15–25% by weight of water is added to a calcined magnesia, converting a part of MgO into $Mg(OH)_2$, to facilitate the shaping as described in the specifications of U.S. Pat. No. 2,695,242, (2) a method in which the surfaces of calcined magnesia are coated with a water-insoluble organic material beforehand and the coated magnesia is shaped by adding water thereto as disclosed in French Pat. No. 1,348,350, (3) a method wherein calcined magnesia is shaped under a heated condition at a temperature of higher than about 300° C., while recycling more than 15% scraps of shaped calcined-magnesia as described in U.S. Pat. No. 3,060,000, and (4) a method in which calcined magnesia is shaped by mixing finely divided cellulose fibres therewith as disclosed in U.S. Pat. No. 3,099,533. Moreover, it has been conventional heretofore to employ a multi-step furnace such as of Herreshof type, in making an easily-shapable calcined magnesia.

We have thoroughly studied the prior arts known heretofore and, as a result, have concluded that all of these prior arts are accompanied by fatal and fundametnal drawbacks as a means of obtaining a dead-burned magnesia used as a high-grade material for furnaces, apart from the problems of workability, economy and equipment.

That is, the incorporation of water or an organic solvent, the recycling of scraps or the mixing of cellulose fibres employed in the prior arts known heretofore more or less lead to laminations due to non-unifromity in the structure.

The laminations occurring at the time of shaping usually disappear substantially during the dead-burning in making a normal-grade magnesia.

However, when making a high-purity magnesia having a purity of MgO exceeding 98% and a molar ratio of CaO to $SiO_2$ of more than 2, the laminations at the time of shaping remains as they are after the dead-burning, even if such a high temperature as above 2000° C. is employed for the dead-burning, causing serious adverse effects on the properties of the resulting dead-burned magnesia. For example, it is easily reduced into flakes and it has non-uniform internal structure having cracks and fissures therein.

SUMMARY OF THE INVENTION

It is, therefore, an object of this invention to provide a method of making a shaped calcined-magnesia, free from the laminations.

That is, in accordance with this invention, there is obtained a refractory grain of dead-burned magnesia having high purity and density as well as high hot compressive strength and having a specific bulk density of more than 3.30 by a method which comprises obtaining a shaped calcined-magnesia free from laminations and cracks by the combination of the following four steps; viz.:

(1) Kneading of magnesium hydroxide
(2) Calcining
(3) Preliminary compressing, crushing and sizing, and
(4) Shaping (pelletizing, briquetting), and dead-burning the resulting shaped calcined-magnesia at a temperature higher than 1900° C.

These steps of this invention mentioned above will be explained, respectively, in detail in the following:

(1) Kneading of magnesium hydroxide

Magnesium hydroxide is obtained by reacting de-$Co_2$ sea water with alkaline material and precipitating the resulting product.

Although calcined dolomite or lime is usually used as an alkaline material, the use of saturated solution of lime as an alkaline material is recommended for obtaining a high-purity magnesium hydroxide. The method has advantages in that the crude slaked lime such as carbide sludge can be obtained easily and inexpensively and that the contamination by impurities such as $SiO_2$, $Al_2O_3$, etc., into the product can be minimized, since the material is used in the form of a saturated solution of $Ca(OH)_2$, though there is an inconvenience in the method in that the equipment becomes somewhat larger.

The resulting magnesium hydroxide is filtered to give a filter cake having a water content of less than 55% by weight. Normally, magnesium hydroxide has a poor filterability, but, no serious difficulty is encountered in reducing the water content in the filter cake to less than 55% by weight by the adoption of the crystal seed recycling method or by the addition of a flocculating agent, conventionally practical heretofore.

When the filter cake having a water content of less than 55% by weight is sufficiently kneaded by a vacuum auger machine, kneader, etc., the particles of filter cake are arranged orderly and the filter cake turns into a paste having a good plasticity.

In calcining the paste-like filter cake in a rotary kiln in the subsequent second step, it is first agglomerated therein by tumbling to form a solid dried magnesium hydroxide, then, turned into agglomerates of calcined magnesia and there is subsequently obtained a shaped magnesia free from the laminations in the following steps.

In the method of this invention, the water content in the filter cake and the kneading procedures are critical. Specifically, it is an essential requisite in the method of this invention to make the water content in the filter cake less than 55% by weight, and to make the viscosity of the paste-like filter cake below 12,000 dyne/$cm^2$ by a sufficient kneading.

If the viscosity of the paste is above 12,000 dyne/$cm^2$ due to insufficient kneading, the densifying of magnesium hydroxide particles is not accomplished satisfactorily and more tend to be powdered because of poor adhesiveness between the particles, thus, there may not be obtained the agglomerates of calcined magnesia. While the viscosity of the paste as set forth above may be achieved quite easily by a simple kneading, if a filter cake containing more than 55% by weight of water, a substantial densification of particles may not be accomplished due to the excessive water content and leads to the same unsatisfactory result as in the insufficient kneading.

(2) Calcining

In the calcining operation of the second step, it is important to maintain the peripheral speed of a rotary kiln at 5–15 m./min., the temperature of product withdrawn from the kiln at 800–900° C., and the ignition loss of 0.2–1.0% to obtain agglomerates having a tapping density of 0.5–0.7 g./$cm^3$.

If the peripheral speed of the rotary kiln is less than 5 m./min., the agglomerating by tumbling is achieved only unsatisfactorily, while the speed exceeding 15 m./min. results not only in the destruction of agglomerates which causes powdering thereof during the tumbling but also in non-uniform calcining.

The temperature of the kilned product of lower than 800° C. leads to intermixing of undecomposed magnesium hydroxide into the product, while the temperature higher than 900° C. reduces the activity of the calcined magnesia, giving rise to unsatisfactory sintering in the later dead-burning step.

In the instant calcining step, it is also necessary to satisfy a requisite with regard to the ignition loss which must be in the range of 0.2–1.0%, as well as the range of calcining temperature set forth above.

The requirement is primarily for obtaining a perfect shaped grain, and when the ignition loss is less than 0.2%, the hardness of particles is increased and the degree of freedom in the mutual arrangement of particles in the later shaping step is decreased to give rise to the laminations. On the contrary, when the ignition loss exceeds 1.0%, the skeleton of starting magnesium hydroxide remains in the calcined magnesia causing the resulting shaped grain to have a structure in which a number of thin layers parallel to the plane on which a pressure is exerted are piled up, thus, there is obtained a dead-burned magnesia refractory grain having very many laminations.

As described above, if magnesium hydroxide is calcined under conditions satisfying the requisites set forth above, the resulting calcined magnesia is inevitably formed into an agglomerate having a tapping density of 0.5–0.7 g./$cm^3$ which is suitable for the later shaping step.

(3) Preliminary compaction, crushing and sizing

In the instant step, the agglomerates of calcined magnesia obtained in the preceding step are subjected to a preliminary compaction, crushing and sizing.

More particularly, the agglomerates obtained in the second step are preliminarily compacted with a relatively low pressure to give a compressed mass having a bulk density of 1.1–1.4 g./$cm^3$ which is then crushed and sized to obtain particles having a maximum diameter of 5 mm., and a tapping density of 1.00–1.25 g./$cm^3$.

The pressure for the preliminary compaction referred to as "a relatively low pressure" in the above description is rather difficult to indicate explicitly in view of the variables in the mechanical characteristics of the compacting machines employed and the amount of work. However, in practice, for example, a double-roll press having smooth surfaces and a pug mill are recommended for the preliminary compaction and crushing, respectively, and it suffices to determine variables so that the compacted mass may have a bulk density of 1.1–1.4 g./$cm^2$ and the particles after the crushing and sizing may have a tapping density of 1.00–1.25 g./$cm^3$ and the maximum diameter of 5 mm. Anyhow, it is important that the pressure employed in the preliminary compaction is sufficiently lower than that employed in the subsequent shaping step.

When the tapping density of the crushed and sized agglomerates is less than 1.00 g./cm.$^3$, no effect of the preliminary compaction may be observed and due to excessive difference in the compression ratios between the material particles and the shaped product, there occurs drastic laminations as observed when the agglomerates are shaped directly, omitting the instant step, while the tapping density exceeding 1.25 g./cm.$^3$ decreases the degree of freedom in the mutual arrangement of the preliminary compacted agglomerates and leads to non-uniform structure of the shaped grain because of granule kernels remaining therein.

In crushing and sizing the preliminary compacted agglomerates, it is necessary to obtain particles having maximum diameters of about 5 mm., avoiding any excessive pulverizing. The presence of agglomerates having a diameter of more than 5 mm. disturbs fillability of the crushed particles into a shaping mould in the subsequent 4th step and gives rise to the laminations.

(4) Shaping (pelletizing, briquetting)

The instant step is for pelletizing the particles obtained in the preceding step under a pressure of 500–2,000 kg./cm.$^2$ into small block-like pieces and any of the conventional shaping or pelletizing machines may be used in the instant step.

In actual practice, the use of a double-roll pelletizing machine provided with moulds of predetermined shape is recommended.

The shaping pressure is dependent upon the type of machine employed. However, for example, the pressure less than 500 kg./cm.$^2$ in a tabletting machine, and that of less than 2,000 kg./cm.$^2$ in a pelletizing machine are normally sufficient. Although the pelletizing under higher pressures than mentioned above affords highly dense pellets having specific bulk densities exceeding 2.1 g./cm.$^3$, there occur the laminations at the time of shaping and the various properties of the refractory grains after the sintering are deteriorated.

Thus, it is an essential requisite in the instant step that the resulting pellet has a bulk density ranging from 1.75 to 2.10. Then, by sintering the pellets thus obtained at high temperatures above 1,900° C., there may be easily produced a high-purity dead-burned magnesia refractory grain having a bulk density higher than 3.30 g./cm.$^3$ and high hot compressive strength.

By observing these conditions as set forth above, there is obtained without adding crystallization promoter or mineralizer a high-purity and highly dense dead-burned magnesia refractory grain having a high hot compressive strength, a purity of MgO calculated as oxide of more than 98%, and a molar ratio of CaO to SiO$_2$ more than 2.

More particularly, in accordance with this invention, there is obtained a dead-burned magnesia refractory grain having excellent properties in a method which comprises obtaining a calcined magnesia pellet having uniform structure and completely free from cracks and laminations by a combination of steps comprising (1) kneading magnesium hydroxide having water content of less than 55% by weight to give a paste having a viscosity of less than 12,000 dyne/cm.$^2$, (2) calcining the paste in a rotary kiln at 800–900° C. with a peripheral speed of 5–15 m./min. to obtain small agglomerates having an ignition loss of 0.2–1.0% and a tapping density of 0.5–0.7 g./cm.$^3$, (3) obtaining secondary agglomerates having a tapping density of 1.00–1.25 from the small agglomerates obtained in (2) by a preliminary compaction of the same followed by crushing and sizing thereof, and (4) shaping the particles under a pressure not exceeding 2,000 kg./cm.$^2$ to obtain a pellet having a specific bulk density of 1.75–2.10 g./cm.$^3$, and dead burning the resuling calcined magnesia pellets at a temperature of above 1900° C. to obtain the desired dead-burned magnesia refractory grains.

In the method of this invention, it is possible to use a rotary kiln either for the calcining or the dead burning, thus, a high-purity dead-burned magnesia for basic refractory materials can be manufactured quite easily and economically.

(e) Description of the preferred embodiments

This invention will be explained more practically in the following example. It should not be construed that the example restricts this invention as it is given merely by way of illustration:

EXAMPLE

There was kneaded in a vacuum auger machine a filter cake of magnesium hydroxide containing 98.3% of MgO, 1.1% of CaO, 0.1% of Fe$_2$O$_3$, 0.1% of Al$_2$O$_3$ and 0.4% of SiO$_2$, all calculated as oxides, and 50% of free water to yield a plastic paste having a viscosity of 11,000 dyne/cm.$^2$. The resulting paste was fed to a rotary kiln and calcined therein at 850° C. with a peripheral speed of kiln at 7.8 m./min. to obtain a calcined magnesia having an ignition loss of 0.6%. The resulting calcined magnesia was in the form of mutually-agglomerated particles having a tapping density of 0.6 g./cm.$^3$ and the particle size distribution was 90% of 3.36–2.38 mm. and 10% of less than 2.38 mm.

Then, the calcined magnesia agglomerate was preliminarily compacted by passing through a plane roll press with a pressure of 200 kg./cm.$^2$ to give a plate-like product of 5 mm. thickness having a bulk density of 1.25 g./cm.$^3$, which was crushed and sized in a pug mill to obtain particles having a tapping density of 1.10 g./cm.$^3$ and particle size distribution involving 50% of 4.76–2.00 mm., 40% of 2.00–0.50 mm., and 10% of less than 0.5 mm.

The resulting agglomerates were shaped into almond pellets measuring 20 mm. x 36 mm. x 15 mm. by using a double roll pelletizing machine under a pressure of 1,500 kg./cm.$^2$. The pelletizing was quite easy, observing no inconveniences such as difficulty in removing pellets from the mould, occurrence of scrap, etc., and internal structure of the resulting pellet was quite uniform and absolutely free from any cracks or laminations. The bulk density of the pellet was 1.90 g./cm.$^3$.

The pellets thus obtained were sintered in a rotary kiln enriched with oxygen at a high temperature of 1950° C. and there were obtained high-purity dead burned magnesia refractory grains having a bulk density of 3.37 g./cm.$^3$, and a refractory brick obtained therefrom had a hot compressive strength of 270 kg./cm.$^2$ at 1450° C.

We claim:

1. In a process for producing a high purity dead burned magnesia refractory grain wherein a high purity magnesium hydroxide having a Mg content of more than 98% calculated as oxide which is obtained by reacting saline water with alkali material is calcined, the resulting calcined magnesia is shaped under pressure and the shaped magnesia thus obtained is dead burned, the improvement which comprises the sequential steps of:

(a) kneading a filter cake of magnesium hydroxide having a water content of less than 55% by weight to form a paste having a viscosity of less than 12,000 dyne/cm.$^2$;

(b) charging said paste into a rotary kiln rotating at a peripheral speed of 5.0–15.0 m./min., and roasting the contents thereof at 800–900° C. to form a calcined magnesia granule having an ignition loss of 0.2–1.0% and a free packing density of 0.5–0.7 g./cm.$^3$;

(c) compressing preliminarily said calcined magnesia under a pressure lower than the pressure employed in step (d) to form a compressed material having a bulk density of 1.1–1.4 g./cm.$^3$ and reducing said compressed material to form particles having maximum diameters of 5.0 mm. and a free packing density of 1.00–1.25 g./cm.$^3$;

(d) pelletizing said particles under a pressure of less than 2000 kg./cm.$^2$ to form a pellet having a bulk density of 1.75–2.10 g./cm.$^3$ free from cracks and laminations, and
(e) dead burning said pellet at a temperature of above 1900° C. to form a high-purity and high-density dead burned magnesia refractory grain having a bulk density of more than 3.30 g./cm.$^3$ and high hot compressive strength and free from cracks and laminations.

References Cited
UNITED STATES PATENTS
3,060,000   10/1962   Snyder et al. _____ 106—58

JAMES E. POER, Primary Examiner

U.S. Cl. X.R.

23—201